United States Patent [19]

Morrison

[11] Patent Number: 4,772,056

[45] Date of Patent: Sep. 20, 1988

[54] STATIC LATCHING ARRANGEMENT AND METHOD

[75] Inventor: Larry Morrison, Manteca, Calif.

[73] Assignee: The United States of America as represented by the United States Department of Energy, Washington, D.C.

[21] Appl. No.: 87,931

[22] Filed: Aug. 21, 1987

[51] Int. Cl.$^4$ .......................... B66C 1/38; B66C 1/66
[52] U.S. Cl. ................................ 294/1.1; 294/82.24; 294/86.17; 294/90; 294/906; 403/13
[58] Field of Search ...................... 294/1.1, 66.1, 67.1, 294/68.1, 68.3, 82.1, 82.11, 82.24–82.28, 86.1, 86.17, 86.21, 86.4, 89–91, 93, 110.1, 110.2, 906; 24/115 R, 115 L, 128, 129 R; 114/218, 230; 403/13, 14

[56] References Cited

U.S. PATENT DOCUMENTS

| | | | |
|---|---|---|---|
| 1,717,497 | 6/1929 | Davis | 294/86.17 |
| 2,649,328 | 8/1953 | Stevenson | 294/86.1 |
| 3,072,430 | 1/1963 | Fahrenwald | 294/90 X |
| 3,416,832 | 12/1968 | Rice | 294/82.24 |
| 3,473,505 | 10/1969 | Brown | 24/115 R X |

Primary Examiner—Johnny D. Cherry
Attorney, Agent, or Firm—P. Martin Simpson, Jr.; Clifton E. Clouse, Jr.; Judson R. Hightower

[57] ABSTRACT

A latching assembly for use in latching a cable to and unlatching it from a given object in order to move an object from one location to another is disclosed herein. This assembly includes a weighted sphere mounted to one end of a cable so as to rotate about a specific diameter of the sphere. The assembly also includes a static latch adapted for connection with the object to be moved. This latch includes an internal latching cavity for containing the sphere in a latching condition and a series of surfaces and openings which cooperate with the sphere in order to move the sphere into and out of the latching cavity and thereby connect the cable to and disconnect it from the latch without using any moving parts on the latch itself.

17 Claims, 3 Drawing Sheets

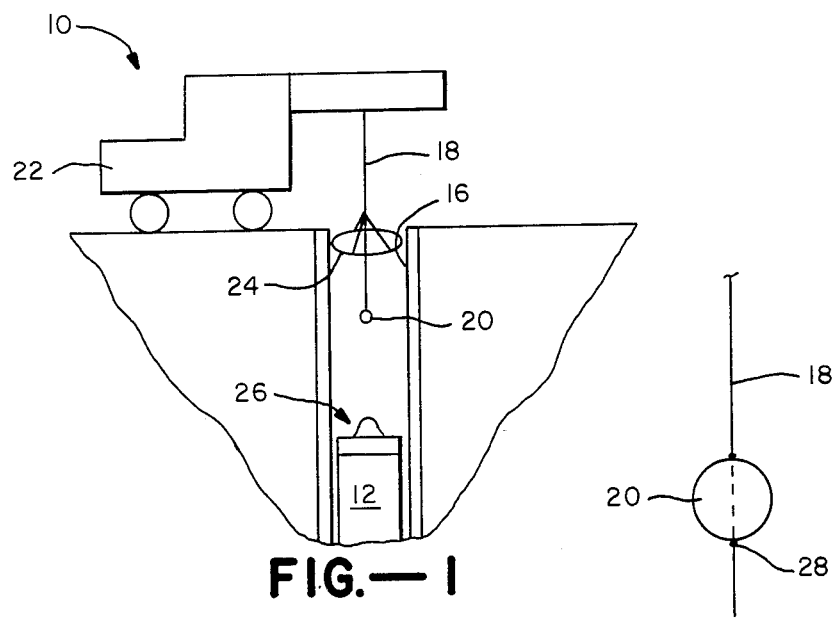
FIG.—1
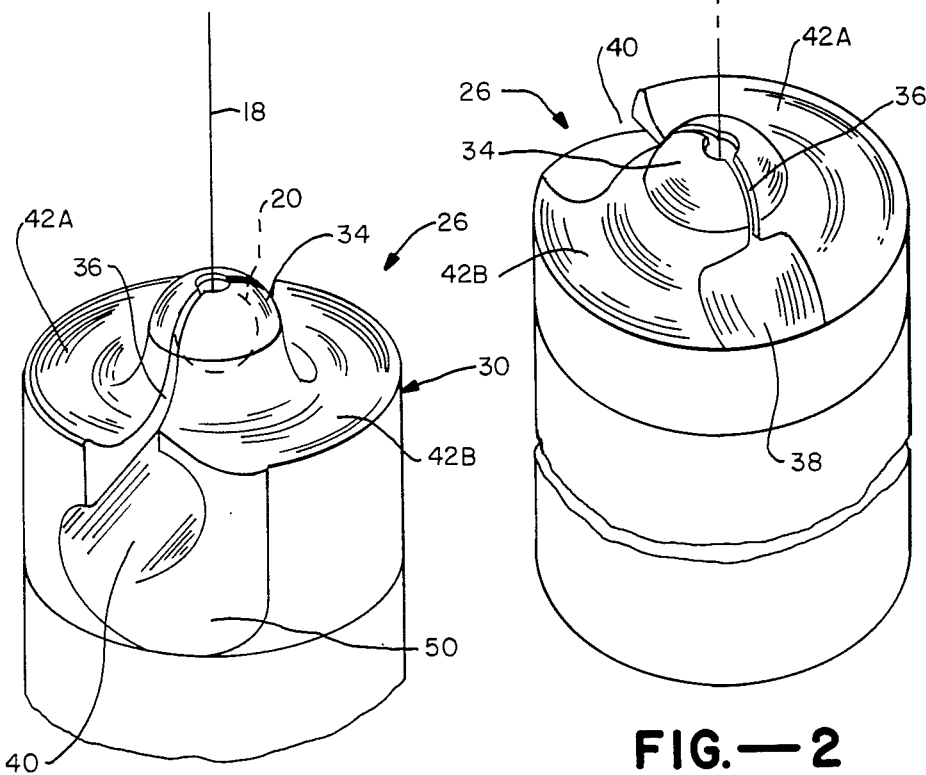
FIG.—2
FIG.—3

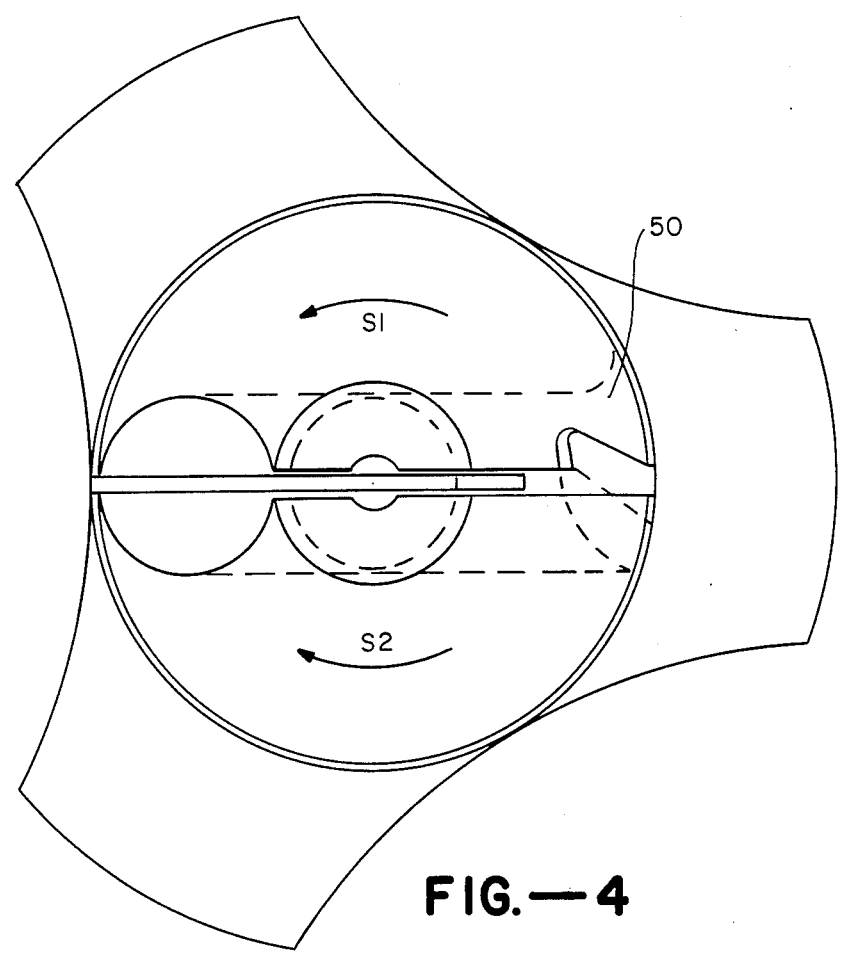
FIG.—4
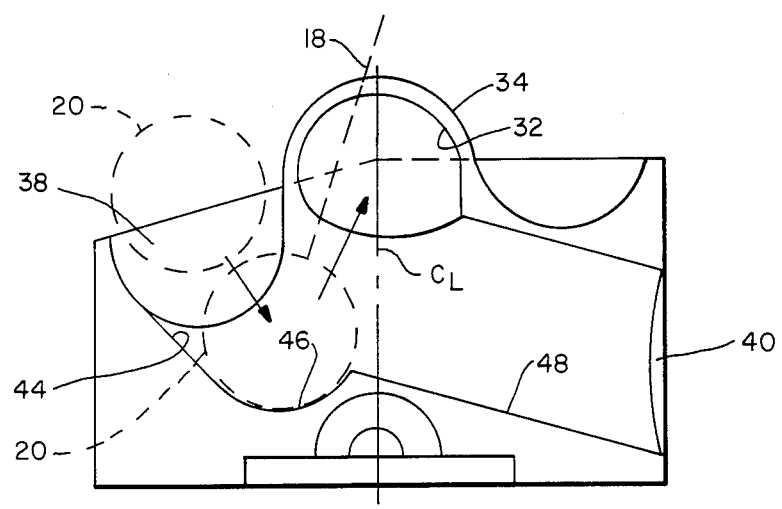
FIG.—5

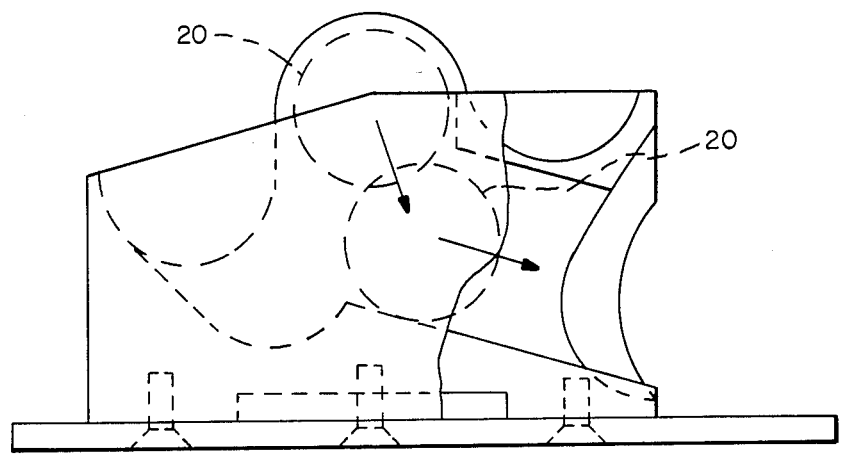
FIG.—6
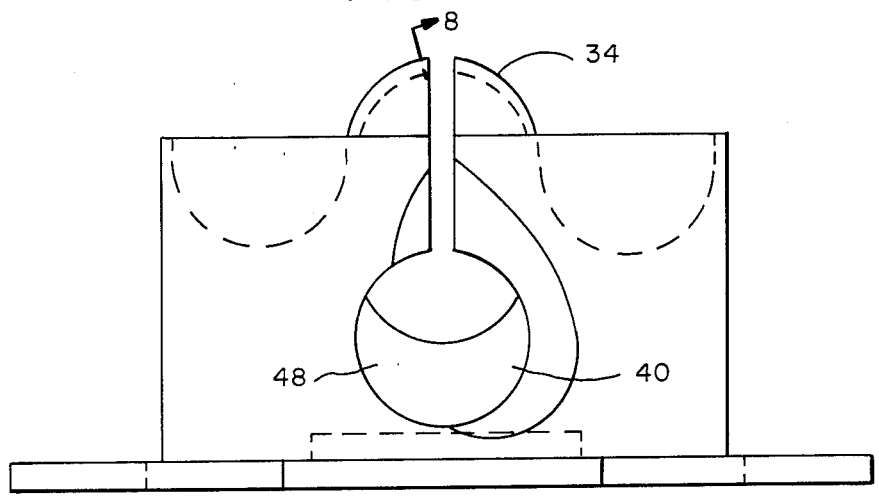
FIG.—7
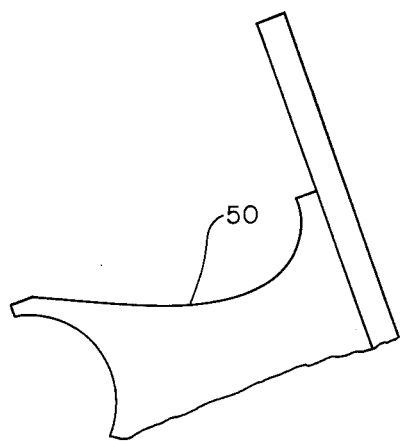
FIG.—8

STATIC LATCHING ARRANGEMENT AND METHOD

FIELD OF THE INVENTION

The United States Government has rights in the invention pursuant to Contract No. W-7405-ENG-48 between the United States Department of Energy and the University of California for the operation of the Lawrence Livermore National Laboratory.

BACKGROUND OF THE INVENTION

The present invention relates generally to a technique for moving a given object from one location to another, and more particularly to a static latching mechanism adapted for connection with the object to be moved.

Nuclear waste material is sometimes stored in cannisters located at the bottom of relatively deep underground holes. These cannisters are typically placed within their respective holes and removed therefrom by means of a cable arrangement which is disengagably connected to a given cannister and then used to either lower the cannister into or raise it out of its hole. In either case, it is necessary that the cable itself be disengagably connected to or released from the cannister when the latter is located at the bottom of the hole. Obviously, the cannister is not accessible and therefore the cable must be latched to and unlatched from the cannister from above. This is typically accomplished by means of a dynamic latch which is actuated electrically, hydraulically or by other suitable means. As will be seen hereinafter, the present invention provides for an improved latching technique and specifically one which utilizes an entirely static latch, that is, one having no moving parts.

SUMMARY OF THE INVENTION

In view of the foregoing, it is an object of the present invention to provide a static latch for use in an overall apparatus for moving a given object from one location to another and specifically an apparatus especially suitable for lowering and raising a cannister filled with nuclear waste material into and out of a relatively deep underground hole.

· Another object of the present invention is to provide a static latch which is uncomplicated in design and reliable in use.

Still another object of the present invention is to provide an overall latching assembly which utilizes this static latch, an overall apparatus incorporating the assembly and a method of moving a given object from one location to another by means of an apparatus which includes such a latch.

As will be described in more detail hereinafter, the overall apparatus disclosed herein includes a cable, a weighted sphere mounted to the cable for rotation about a specific diameter of the sphere when the cable is weighted vertically downward by the sphere, and means for raising and lowering the cable and weighted sphere along a particular vertical axis. The weighted sphere forms part of the latching assembly which also includes a static latch adapted for connection with a given object, for example the cannister referred to above.

The static latch disclosed herein is designed in accordance with the present invention and includes a hollow latch body having an internal latching cavity for containing the sphere in a latching condition and a slotted opening which extends into and across the top of the cavity and which is sufficiently large to accommodate a section of the cable but smaller than the sphere itself. The latch body also includes an arrangement of openings and surfaces for guiding the sphere into the latching cavity when the sphere, while connected to the end of the cable, is first moved downward by its weight and then pulled upward by the cable, while a section of the cable above the sphere moves with the latter into the cooperating slotted opening. This arrangement of openings and surfaces also serves to guide the sphere out of the cavity and the latch body itself by moving the sphere downward by its own weight from within the cavity which, in turn, causes a section of the cable above the sphere to move with the latter out of the slotted opening.

Additional objects, advantages and novel features of the invention will be set forth in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The overall apparatus discussed briefly above and particularly its static latch will be described in more detail hereinafter in conjunction with the drawings wherein:

FIG. 1 diagrammatically illustrates the apparatus of the present invention for use in lowering and raising a cannister or other such object into and out of the deep hole;

FIG. 2 is a perspective view of the cannister itself, specifically illustrating the static latch which is connected to the top of the cannister and which is designed in accordance with the present invention;

FIG. 3 is a different perspective view of the static latch illustrated in FIG. 2;

FIG. 4 is a plan view of the static latch illustrated in FIGS. 2 and 3;

FIGS. 5–7 are different side elevational views of the latch illustrated in FIGS. 2 and 3; and FIG. 8 is a sectional view of the latch illustrated in FIG. 7, taken generally along line 7—7 in FIG. 7.

DETAILED DESCRIPTION OF THE INVENTION

Reference will now be made in detail to a preferred embodiment of the invention, an example of which is illustrated in the accompanying drawings. While the invention will be described in connection with this preferred embodiment, it will be understood that it is not intended to limit the invention to that embodiment. On the contrary, it is intended to cover all alternative modifications and equivalents as may be included within the spirit and scope of the invention as defined by the appended claims.

Turning now to the drawings, wherein like components are designated by like reference numerals throughout the various figures, attention is first directed to FIG. 1. This figure diagrammatically illustrates an overall apparatus 10 for lowering and raising a cannister 12 into and out of a hole in the ground, which hole is generally indicated at 16. The apparatus includes a cable 18, a weighted sphere 20 mounted to the free end of cable 18 in a manner to be described hereinafter, and a vehicle 22 or other such suitable power-driven hoisting means for raising and lowering the cable and sphere along a particular vertical axis. In this regard, it should be noted that the sphere itself must be sufficiently heavy to weight down the cable in the manner illustrated. At the same time, the hoisting means forming part of vehicle 22 includes suitable means for ensuring that the vertical axis defined by cable 18 can be accurately positioned, for example, along the center line of hole 16. A suitable spider-shaped means generally indicated at 24 may be provided for this purpose such as a readily available spider arrangement.

In addition to the various components described thus far, overall apparatus 10 includes a static latch 26 connected to the top end of cannister 12. As will be seen hereinafter, this latch is comprised of a hollow body having an internal latching cavity for containing sphere 20 in a latching condition and an arrangement of surfaces and openings for directing the sphere into and out of the cavity in order to connect cable 18 to and disconnect it from cannister 12. More specifically, as will be seen hereinafter, this arrangement of surfaces and openings guides the sphere into the latching cavity for connecting cable 18 to cannister 12 when the sphere, while connected to the end of cable 18, is first moved downward by its own weight and then pulled upward by the cable, while a section of the cable immediately above the sphere moves with the sphere into the cooperating slotted opening forming part of the arrangement. This arrangement of surfaces and openings also serves to guide the sphere out of the latching cavity for disconnecting cable 18 from the cannister when the sphere, while connected to the end of the cable, is first moved downward by its own weight from within the cavity, while a section of the cable immediately above the sphere moves with the latter out of the same slotted opening it entered.

Turning now to remaining FIGS. 2-8, attention is directed specifically to the sphere 20 and static latch 26 which together form part of an overall specific latching assembly for use in latching a cable such as cable 18 to and unlatching it from a given object such as cannister 12 in order to move the object from one location to another, for example, to and from opening 16. While this assembly is especially suitable as part of overall apparatus 10, it is to be understood that the latching assembly and, indeed, the apparatus itself may be utilized to move objects other than cannister 12 between different locations. In addition, it is to be understood that the latching assembly illustrated in FIG. 2 not only includes sphere 20 and latch 26 but also suitable means to be described below for connecting the sphere to cable 18 in a specific way.

Referring to FIG. 2, sphere 20 is shown connected to the free end of cable 18. The sphere is connected to the cable by any suitable means which allows the sphere to rotate about its vertical diameter in axial alignment with vertically extending cable 18. In an actual working embodiment, a straight support pin 28 is located within an opening extending along a diameter of sphere 20. One end of the pin is connected in a suitable manner to cable 18. The support pin is disposed within its cooperating opening so that the sphere is free to rotate about the longitudinal axis of the pin.

Still referring to FIG. 2 in conjunction with FIGS. 3-8, latch 26 is shown comprised of the hollow latch body 30 which, as best illustrated in FIG. 5, defines an internal latching cavity 32 for containing sphere 20 in a latching condition. Note that the latching cavity is located in the center of latch body 30 within a raised dome 34. For reasons to be described hereinafter, the slotted opening 36 extends across the center of dome 34 into cavity 32 from an inlet opening 38 into the latch body to an outlet opening 40 out of the latch body. As best seen in FIGS. 2, 3 and 4, the top of latch body 30 defines a pair of upwardly facing, external guide surfaces 42a and 42b located on opposite sides of dome 34 and slotted opening 36. As best illustrated in FIG. 2, the guide surface 42a slopes downward from one side of outlet opening 40 to one side of inlet opening 38 while guide surface 42b slopes downward from the opposite side of outlet opening 42 to the opposite side of inlet opening 38.

Turning specifically to FIGS. 5 and 6, latch body 30 is shown including a ramped surface 44 extending downwardly from inlet opening 38 into a pocket 46. Note specifically that pocket 46 is located below support cavity 32 and laterally offset with respect to this cavity, that is, to one side of a vertical center line $C_L$ extending through the center of cavity 32 and dome 34. A ramped surface 48 extends downward from pocket 46 through outlet opening 40 and into a pocket 50 located outside the latch body, as best illustrated in FIG. 4. Note specifically that ramp 48 extends across center line $C_L$ directly under support cavity 32.

Having described static latch 26, attention is now directed to the way in which sphere 20 is placed into and removed from latching cavity 32 in order to connect cable 18 to and disconnect it from the latch and therefore cannister 12 or any other given object to which the latch is to be connected. To this end, attention is returned to FIG. 2 in conjunction with FIG. 4 for a discussion of the way in which sphere 20 is placed within latching cavity 32. To begin with, it is important to line cable 18 up with center line $C_L$ through cavity 32 and dome 34 immediately above the dome, as shown in FIG. 2. This is accomplished by spider means 24. The sphere is then lowered by the cable until it engages the dome. The slot 36 is designed so that it is too small for the sphere but will accommodate the cable. Thus, as the sphere engages dome 34 it either rolls off the dome into guided surface 42a or guided surface 42b. In either case, the sphere rolls about support pin 28 downward along one of the guide surfaces 42 by its own weight and into entry opening 38. Referring specifically to FIG. 5, the sphere enters the inlet opening and moves down surface 44 into pocket 46 as the ball is continuously lowered. At the same time, a section of cable 18 immediately above the sphere moves into slotted opening 36 from its entry end. FIG. 5 illustrates sphere 20 by dotted lines sitting within pocket 46. Note that the sphere is laterally offset with respect to latching cavity 32. However, note also that because cable 18 is biased along the center line $C_L$ of cavity 32 it wants to swing the sphere into alignment with the cavity. Thus, the sphere can be moved into the latching cavity from pocket 46 by merely raising the sphere by means of the cable. This pulls the sphere into its latching position within the cavity, as best illustrated in FIG. 6. Note that as this occurs, the section of cable 18 within slot 36 moves further within the slot so that the cable is again in line with center line $C_L$.

Having described the way in which sphere 20 is moved into latching cavity 32 in order to connect cable 18 to the latch, attention is now directed to the way in which sphere 20 is removed from the latch in order to disconnect the latter of cable 18. Still referring to FIG. 5 in conjunction with FIG. 6, note that ramp 48 lies directly below sphere 20 as the latter sits within pocket 32. In order to remove the sphere from latch body 30, it is only necessary to lower the sphere directly downward along center line $C_L$. Eventually, it engages ramp 48 and rolls downward, as indicated in FIG. 6. Ramp 48 leads to exit opening 40 and eventually to outside pocket 50 best illustrated in FIGS. 3 and 4. The sphere eventually comes to rest in pocket 50 which is located outside the latch housing. Thus, the sphere can be raised vertically upward and, because of the bias of cable 18, it will eventually swing up and directly over the latch as it is pulled upward by the cable.

The foregoing description of the preferred embodiment has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended thereto.

What is claimed is:

1. A latching assembly for use in latching a cable to and unlatching it from a given object in order to move the object from one location to another, said assembly comprising:
   (a) a weighted sphere;
   (b) means for mounting said sphere to one end of said cable such that the sphere will weight down said cable and will rotate about a specific diameter of the sphere when the cable is weighted vertically downward by the sphere;
   (c) a static latch adapted for connection with said given object, said latch including a hollow latch body having an internal latching cavity for containing said sphere in a latching condition and a slotted opening which extends into and across the top of said cavity and which is sufficiently large to accommodate a section of said cable but smaller than said sphere, said latch body including means defining
      (i) a first arrangement of surfaces for guiding said sphere into said latching cavity when said sphere, while connected to said end of said cable, is first moved downward by its own weight and then pulled upward by said cable, while a section of said cable above said sphere moves with said sphere into said slotted opening, and
      (ii) a second arrangement of surfaces for guiding said sphere out of said cavity when said sphere, while connected to said end of said cable, is first moved downward by its own weight from within said cavity, while a section of said cable above said sphere moves with the latter out of said slotted opening.

2. An assembly according to claim 1 wherein said specific diameter about which said sphere is able to rotate is a diameter that is coaxial with said cable when the cable is weighted downward.

3. An assembly according to claim 1 wherein said first arrangement of surfaces includes a first downwardly sloped external guide surface for allowing said sphere to roll downward by its own weight to a latch entry point at the lower end of said first surface, and a second surface extending downward from said latch entry point and forming an intermediate entry pocket below but opening up to said latching cavity laterally offset with respect to the center of said cavity, whereby when said sphere is first moved downward by its own weight it rolls downward on said first surface and into said pocket and when said sphere is then pulled upward it moves out of said pocket and into said cavity.

4. An assembly according to claim 3 wherein said second arrangement of surfaces defines a sloped guide ramp extending downwardly from a point immediately vertically below said latching cavity to an exit point outside said latch body.

5. An assembly according to claim 3 wherein said first arrangement includes a second downwardly sloped external guide surface extending from the uppermost end of said first external guide surface to said latch entry point along a path different than the path of said first surface whereby to allow said sphere to roll downward by its own weight to a latch entry point along said different path.

6. A static latch adapted for connection with a given object and forming part of an assembly for use in latching a cable to and unlatching it from said given object in order to move the object from one location to another, said assembly including a weighted sphere and means for mounting said sphere to one end of said cable such that the sphere will weight down said cable and will rotate about a specific diameter of the sphere when the cable is weighted vertically downward by the sphere, said static latch comprising a hollow latch body having an internal latching cavity for containing said sphere in a latching condition and a slotted opening which extends into and across the top of said cavity and which is sufficiently large to accommodate a section of said cable but smaller than said sphere, said latch body including means defining
   (a) a first arrangement of surfaces for guiding said sphere into said latching cavity when said sphere, while connected to said end of said cable, is first moved downward by its own weight and then pulled upward by said cable, while a section of said cable above said sphere moves with said sphere into said slotted opening, and
   (b) a second arrangement of surfaces for guiding said sphere out of said cavity when said sphere, while connected to said end of said cable, is first moved downward by its own weight from within said cavity, while a section of said cable above said sphere moves with the latter out of said slotted opening.

7. A static latch according to claim 6 wherein said specific diameter about which said sphere is able to rotate is a diameter that is coaxial with said cable when the cable is weighted downward.

8. A static latch according to claim 6 wherein said first arrangement of surfaces includes a first downwardly sloped external guide surface for allowing said sphere to roll downward by its own weight to a latch entry point at the lower end of said first surface, and a second surface extending downward from said latch entry point and forming an intermediate entry pocket below but opening up to said latching cavity laterally offset with respect to the center of said cavity, whereby when said sphere is first moved downward by its own weight it rolls downward on said first surface and into said pocket and when said sphere is then pulled upward it moves out of said pocket and into said cavity.

9. A static latch according to claim 8 wherein said second arrangement of surfaces defines a sloped guide ramp extending downwardly from a point immediately vertically below said latching cavity to an exit point outside said latch body.

10. A static latch according to claim 8 wherein said first arrangement includes a second downwardly sloped external guide surface extending from the uppermost end of said first external guide surface to said latch entry point along a path different than the path of said first surface whereby to allow said sphere to roll downward by its own weight to a latch entry point along said different path.

11. An apparatus for moving a given object from one location to another, comprising
   (a) a cable;
   (b) a weighted sphere;
   (c) means for mounting said sphere to one end of said cable such that the sphere will weight down said cable and will rotate about a specific diameter of the sphere when the cable is weighted vertically downward by the sphere;
   (d) means for raising and lowering said cable and weighted sphere along a particular vertical axis;
   (e) a static latch connected with said given object, said latch including a hollow latch body having an internal latching cavity for containing said sphere in a latching condition and a slotted opening which extends into and across the top of said cavity and which is sufficiently large to accommodate a section of said cable but smaller than said sphere, said latch body including means defining
      (i) a first arrangement of surfaces for guiding said sphere into said latching cavity when said sphere, while connected to said end of said cable, is first moved downward by its own weight by said raising and lowering means along said vertical axis and then pulled upward by said cable along said vertical axis, while a section of said cable above said sphere moves with said sphere into said slotted opening, and
      (ii) a second arrangement of surfaces for guiding said sphere out of said cavity when said sphere, while connected to said end of said cable, is first moved downward by its own weight from within said cavity, while a section of said cable above said sphere moves with the latter out of said slotted opening.

12. An apparatus according to claim 11 wherein said specific diameter about which said sphere is able to rotate is a diameter that is coaxial with said cable when the cable is weighted downward.

13. An apparatus according to claim 11 wherein said first arrangement of surfaces includes a first downwardly sloped external guide surface for allowing said sphere to roll downward by its own weight to a latch entry point at the lower end of said first surface, and a second surface extending downward from said latch entry point and forming an intermediate entry pocket below but opening up to said latching cavity laterally offset with respect to the center of said cavity, whereby when said sphere is first moved downward by its own weight it rolls downward on said first surface and into said pocket and when said sphere is then pulled upward it moves out of said pocket and into said cavity.

14. An apparatus according to claim 13 wherein said second arrangement of surfaces defines a sloped guide ramp extending downwardly from a point immediately vertically below said latching cavity to an exit point outside said latch body.

15. An apparatus according to claim 13 wherein said first arrangement includes a second downwardly sloped external guide surface extending from the uppermost end of said first external guide surface to said latch entry point along a path different than the path of said first surface whereby to allow said sphere to roll downward by its own weight to a latch entry point along said different path.

16. A latching assembly for use in latching a cable to and unlatching it from a given object in order to move the object from one location to another, said assembly comprising:
   (a) a weighted sphere;
   (b) means for mounting said sphere to one end of said cable such that the sphere will weight down said cable and will rotate about a specific diameter of the sphere when the cable is weighted vertically downward by the sphere;
   (c) a static latch adapted for connection with said given object, said latch including a hollow latch body having an internal latching cavity for containing said sphere in a latching condition and a slotted opening which extends into and across the top of said cavity and which is sufficiently large to accommodate a section of said cable but smaller than said sphere, said latch body including means defining an arrangement of surfaces and openings
      (i) for guiding said sphere into said latching cavity when said sphere, while connected to said end of said cable, is first moved downward by its own weight and then pulled upward by said cable, while a section of said cable above said sphere moves with said sphere into said slotted opening, and (ii) for guiding said sphere out of said cavity when said sphere, while connected to said end of said cable, is first moved downward by its own weight from within said cavity, while a section of said cable above said sphere moves with the latter out of said slotted opening.

17. The method of moving a given object from one location to another, comprising the steps of:
   (a) providing an entirely static, hollow latch which includes an internal latching and unlatching cavity with an entry into said cavity and which is configured so as to disengagably connect with a weighted sphere when the latter is first moved downward into the entry of said latch and then back upward into its cavity and thereafter disconnect from said sphere by lowering the latter downward out of said cavity through a cooperating exit opening in the latch;
   (b) providing said sphere at the end of a cable such that the sphere is able to weight the cable vertically downward;
   (c) connecting said latch with said given object;
   (d) hanging said cable vertically downward with the sphere at its lower end;
   (e) moving said sphere into the entry of said latch and then pulling said sphere upward into the cavity of said latch thereby to disengagably connect the sphere and cable to said latch and therefore said object;
   (f) moving said given object to a different location by moving said cable and sphere to said different location; and
   (g) moving said sphere downward from the latch's cavity and out of the exit opening of said latch in order to disconnect said sphere and cable from said latch and given object.

* * * * *